United States Patent [19]

Skoultchi

[11] 3,880,956

[45] Apr. 29, 1975

[54] ADHESIVE AND SEALANT COMPOSITIONS

[75] Inventor: Martin M. Skoultchi, Somerset, N.J.

[73] Assignee: National Starch and Chemical Corporation, Bridgewater, N.J.

[22] Filed: Oct. 29, 1973

[21] Appl. No.: 410,912

[52] U.S. Cl.......... 260/89.5 R; 117/124; 117/128.4; 117/139; 117/161; 260/31.8 R; 260/42.17; 260/42.21; 260/42.52; 260/63 UY; 260/77.5 AP; 260/78.4 N; 260/78.5 UA; 260/86.1 R; 260/86.1 E; 260/86.7; 260/88.3 A; 260/89.5 A; 260/89.5 N; 260/89.7 R
[51] Int. Cl............................. C08f 3/64; C08f 3/66
[58] Field of Search... 260/89.5 R, 89.5 A, 77.5 AP, 260/78.4 N, 89.7 R

[56]  References Cited
UNITED STATES PATENTS
3,775,385   11/1973   Ozono et al. .................. 260/89.5 A

OTHER PUBLICATIONS

Oster, Chem. Abs., 57, pp. 4816, d, (Aug. 20, 1962).

*Primary Examiner*—Harry Wong, Jr.

[57]  ABSTRACT

Anaerobic curing compositions useful as anaerobic adhesives and sealants are described, said compositions comprising mixtures of polymerizable acrylic and substituted acrylic monomers and diazonium salts at latent polymerization catalysts therefor.

22 Claims, No Drawings

ADHESIVE AND SEALANT COMPOSITIONS

This invention relates to anaerobic curing compositions utilizing polymerizable acrylic and substituted acrylic monomers and diazonium salts as latent polymerization catalysts therefor. The compositions are stable for periods of time extending to a half-year or more in the presence of air or oxygen, but cure rapidly (set-up, polymerize) in the absence of air or oxygen and in the presence of certain metals thereby finding use as anaerobic adhesives and sealants.

Anaerobic curing compositions are known and well described in the prior art. U.S. Pat. No. 2,628,178 issued Feb. 10, 1953 (General Electric) describes the preparation of anaerobic curing compositions which relied on the oxygenation of certain monomers until at least 0.1% of active oxygen was introduced into the monomer. The oxygenated monomer remained stable until polymerization was initiated by the absence of air. A more recent patent, U.S. Pat. No. 2,895,950 issued July 21, 1959 (Krieble), describes compositions containing defined polymerizable polyacrylate ester monomers together with hydroperoxide catalysts. Typical catalysts described therein include cumene hydroperoxide, methyl ethyl ketone hydroperoxide, as well as certain oxygenated compounds, for example, oxygenated 2-methyl butene-1 and oxygenated cyclohexane. Later patents dealing with anaerobic curing sealants all rely on use of catalysts which are of the peroxide, hydroperoxide or perester class of compounds.

I have now found that anaerobic curing compositions characterized in possessing an extended shelf life of a half-year or more in the presence of air or oxygen together with the ability to polymerize or set-up rapidly when excluded from air or oxygen and in contact or presence of certain metals can be formed comprising the mixture of a polymerizable acrylic or substituted acrylic monomer and diazonium salts. These properties render the compositions particularly useful in the anaerobic bonding of adjacent or closely facing surfaces at least one of which is metal, for example, the mating threads of a nut and bolt.

My composition utilize polymerizable compounds (unoxygenated) corresponding to the general formula:

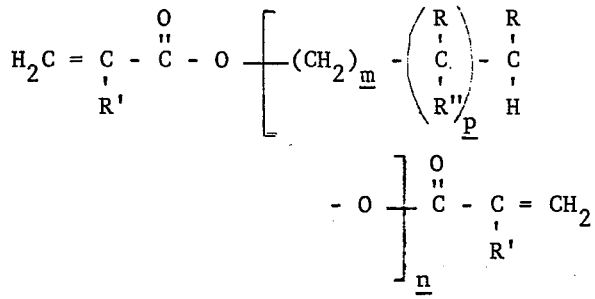

wherein R is selected from the group consisting of hydrogen, methyl, ethyl,

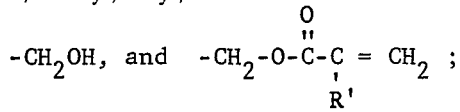

R' is selected from the group consisting of hydrogen, chlorine, methyl and ethyl;

R'' is selected from the group consisting of hydrogen, hydroxy, and

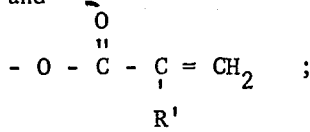

$m$ is an integer equal to at least 1, e.g., from 1 to 8 or higher and preferably from 1 to 4 inclusive;

$n$ is an integer equal to at least 1, e.g., from 1 to 20 or more; and $p$ is one of the following: 0 to 1.

Monomers useful in this invention and which come within the above general formula include, for example, ethylene glycol dimethyacrylate, ethylene glycol diacrylate, polyethylene glycol diacrylate, dimethacrylic ester of tetraethylene glycol, diglycerol diacrylate, diethylene glycol dimethacrylate, pentaerythritol triacrylate, and other polyether diacrylates and dimethacrylates.

The above class of monomers is in essence described in U.S. Pat. No. 3,043,820 issued July 10, 1962 (to R. H. Krieble).

A second class of polymerizable monomers useful in my compositions correspond to the general formula:

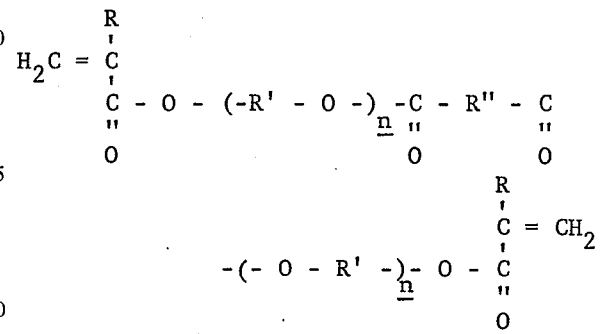

wherein

R represents hydrogen, chlorine, methyl or ethyl,

R' represents alkylene with 2–6 carbon atoms,

R'' represents $(CH_2)_m$ in which $m$ is an integer of from 0 to 8,

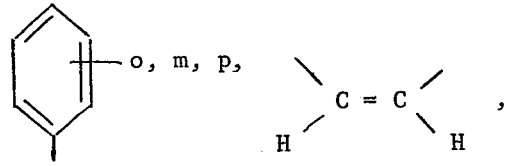

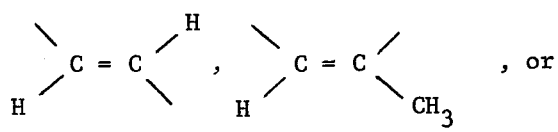

and $\underline{n}$ represents an integer of from 1 to 4.

Typical monomers of this class include, for example, dimethacrylate of bis(ethylene glycol) adipate, dimethacrylate of bis(ethylene glycol) maleate, dimethacrylate of bis(diethylene glycol) phthalate, dimethacrylate of bis(tetraethylene glycol) phthalate, dimethacrylate of bis(tetraethylene glycol) malonate, dimethacrylate of bis(tetraethylene glycol) sebacate, dimethacrylate of bis(ethylene glycol) phthalate, dimethacrylate of bis(tetraethylene glycol) maleate, and the diacrylates and $\alpha$-chloroacrylates corresponding to said dimethacrylates, and the like.

The above class of monomers is in essence described in U.S. Pat. No. 3,457,212 issued July 22, 1969 (Sumitomo Chemical Company, Ltd.).

Also useful herein are monomers which are isocyanatehydroxyacrylate or isocyanateaminoacrylate reaction products which may be characterized as acrylate terminated polyurethanes and polyureides or polyureas. These monomers correspond to the general formula:

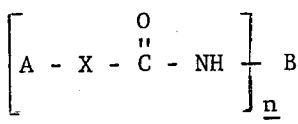

wherein X is selected from the group consisting of —O— and

and R is a member selected from the group consisting of hydrogen and lower alkyl of 1 to 7 carbon atoms; A represents the organic residue of an active hydrogen containing acrylic ester and the methyl, ethyl and halogen homologs thereof; i.e., an acrylate ester containing hydroxy or amino functional groups on the alkyl portion thereof wherein the active hydrogen has been removed; n is an integer from 1 to 6 inclusive; and B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals both substituted and unsubstituted.

Typical monomers of this class include the reaction product of mono- or polyisocyanate, for example, toluene diisocyanate, with an acrylate ester containing a hydroxy or amino group in the non-acrylate portion thereof, for example, hydroxyethyl methacrylate.

The above class of monomers is in essence described in U.S. Pat. No. 3,425,988 issued Feb. 4, 1969 (Loctite Corporation).

In addition to the monomers already described, other useful monomers are monofunctional acrylate esters and their derivatives, i.e., esters containing one acrylate group or derivatives thereof. Such monomers include, for example, methyl acrylate, methyl methacrylate, ethyl acrylate, ethyl methacrylate, hydroxyethyl methacrylate, hydroxypropyl acrylate, hydroxypropyl methacrylate, butyl acrylate, n-octyl acrylate, 2-ethylhexyl acrylate, decylmethacrylate, dodecyl methacrylate, cyclohexyl methacrylate, tert.-butyl methacrylate, acrylamide, N-methylolacrylamide, diacetone acrylamide, N-tert.-butyl acrylamide, N-tert.-octyl acrylamide, N-butoxyacrylamide, gamma-methacryloxypropyl trimethoxysilane, 2-cyanoethyl acrylate, 3-cyanopropyl acrylate, tetrahydrofurfuryl chloroacrylate, and the like.

The monomers useful herein are seen to be polymerizable monomers having one or more acrylic or substituted acrylic groups as a common, unifying characteristic, and for convenience may be generically termed acrylic and substituted acrylic monomers.

By the term "unoxygenated" as used in connection with monomers, it is intended to designate monomers which have not been oxygenated within the meaning described in U.S. Pat. No. 2,628,178.

It is understood that the various monomers useful herein are not required to be in a highly purified state. The monomers may be comprised of commercial grades in which inhibitors, stabilizers, or other additives or impurities may be present, as well as those prepared in the laboratory or in pilot plant scale.

My compositions utilize catalysts which are stable or stabilized diazonium salts and correspond to the general formula:

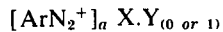

In the above formula, $a$ is an integer of 1, 2 or 3 taken so as to equalize the valence charge of the salt and Ar is any aryl or substituted aryl radical and includes diazonium substituted aryl radicals. X is an anion such as is ordinarily found in known diazonium salts and is taken so as to act as a counter-ion to the aryl diazonium cation moiety of the salt. X includes, for example, $F^-$, $Cl^-$, $Br^-$, $SO_4^{--}$, $HSO_4^-$, $Ar'SO_3^-$, $Ar'(SO_3)_2^{--}$, and $Ar'(SO_3)_3^{---}$; Ar' is an aryl or substituted aryl radical. Y represents a stabilizing agent for the diazonium salt such as are well known in the art and may or may not be present. Y includes, for example, $ZnCl_2$, $BF_3$, $HgCl_2$, $PtCl_2$, $PtCl_4$, and $AuCl_3$. In usual practice, the stabilizing agent complexes with the diazonium salt and therefore is present in approximately stoichiometric amounts. Many diazonium salts in which the anion is selected from the group $SO_4^{--}$, $HSO_4^-$, $Ar'SO_3^-$, and $Ar'(SO_3)_2^-$$_3$, may not require a stabilizing agent.

For illustrative purposes, typical diazonium salts useful in the compositions of this invention include, for example, bis(2-methyl-4-chlorobenzenediazonium) naphthalenedisulfonate, bis(2-methoxy-4-nitrobenzenediazonium) naphthalenedisulfonate, bis[4-(N,N-diethylamino)-2-methoxybenzenediazonium] tetrafluoroborate, bis(3-nitro-4-chlorobenzenediazonium) tetrachlorozincate, bis(4-nitrobenzenediazonium) sulfate, 1,4-tetramethylene bis(4,4'-diazo) benzoate zinc chloride complex and bis[4-(N-phenylamino) benzenediazonium] sulfate.

The amount of catalyst used in my compositions should be an amount effective to initiate polymerization of the monomer when the composition is in contact with or closely adjacent to a selected metal, later described, and in the absence of air or oxygen. Such effective amounts of catalyst will vary mainly depending on the monomer component of the composition and also depending on the metal with which it is to be used. For most applications, however, the amount of catalyst, i.e. the diazonium salt, will range from about 0.01 or less to 10% or more, based on the weight of the monomer. The preferred amount of catalyst will range from about 0.2 to 2%, based on the weight of the monomer. It can be understood that mixtures of diazonium salts may also be employed as catalysts herein.

If the dissolving of the catalyst in the monomer presents a problem or if a relatively larger amount of a particular catalyst is necessary in connection with a monomer in which solubility is difficult, then solvents which dissolve the diazonium salt and themselves are soluble in the monomer may be employed. Common solvents for diazonium salts are described in the literature and include, for example, alkanols such as methanol, ethanol, butanol; substituted and unsubstituted formamides such as formamide and N,N-dimethyl formamide; and water. Methanol and ethanol are the preferred solvents. In most instances, only that minimum amount of solvent is used so as to dissolve the diazonium salt.

In preparing my compositions, it is within the scope of my invention that the required acrylic monomer may be a mixture of acrylic monomers rather than a single acrylic monomer, and there may also be utilized, in combination therewith, other non-acrylic, ethylenically unsaturated copolymerizable comonomers such as unsaturated hydrocarbons, unsaturated esters and ethers, vinyl esters, and the like. Typical optional comonomers include: vinyl acetate, methyl vinyl ether, methyl vinyl ketone, poly(ethylene maleate), allyl alcohol, allyl acetate, 1-octene, styrene, etc.

In certain applications, and largely dependent on the particular acrylic monomer being utilized, such non-acrylic, polymerizable comonomer(s) may be added to constitute up to about 60%, by weight, of the monomer composition. Preferably, however, the optional, non-acrylic comonomer will constitute no more than 50%, by weight, of the monomer composition, and most preferably, it will constitute no more than 30%, by weight, of the monomer composition.

Optionally, the compositions may also contain a minor amount, up to 50%, by weight, of a polymeric thickener, for example, a low or high molecular weight polymer or prepolymer. Illustrative of such polymeric thickeners is a commercially available methacrylate polymer sold by E. I. DuPont de Nemours and Company, under the trademark ELVACET 2042.

In order to further modify the properties of my compositions, they may optionally contain plasticizers such, for example, as dibutyl phthalate or triethylene glycol. Other optional ingredients include, inorganic thickeners, organic and inorganic fillers, cut glass fibers, as well as visible or ultraviolet fluorescent dyes.

My compositions can be formulated with or without a stabilizer compound added to the monomeric composition to prevent or retard the premature decomposition of the diazonium salt catalyst. Useful stabilizer compounds are materials classified in the chemical literature as Lewis acids and their salts. They include the stabilizing agents previously described in connection with the stabilizing of the diazonium salts as well as, for example, sulfosalicylic acid, sulfuric acid, toluene sulfonic acid, naphthalene disulfonic acid, naphthalene trisulfonic acid, and the lithium, sodium and potassium salts of these acids, aluminum chloride, etc. When such optional stabilizer compounds are used, they are used in concentrations of from about 0.001 to 1%, by weight, of the total composition. The desirability or necessity of utilizing these stabilizer compounds can easily be recognized by the practitioner in the art.

In order to prepare my anaerobic-curing composition, it is merely necessary to mix the desired amount of diazonium salt (at times dissolved in a small amount of solvent) with the selected acrylic monomer or monomers which may optionally contain non-acrylic copolymerizable monomer. Optional ingredients can be premixed into the monomer or alternatively admixed into the prepared composition.

The curing or polymerization of my compositions is initiated by the absence of air or oxygen and the contact of the adhesive with selected metal surfaces. The metals effective with the compositions described herein include iron, copper, tin, aluminum and silver and their alloys. Cadmium, chromium, nickel and zinc chromate platings have also been found to be useful in connection with my compositions. The surfaces provided by the metals, alloys, and metallic platings which are useful in initiating the cure of these compositions will, for convenience, be grouped into the term "active metal" surfaces and be understood to include but not be limited to all of the metallic entities mentioned above. As used herein, the term active metal will designate any metal, alloy or metallic plating capable of initiating the polymerization of my compositions on contact therewith in the absence of air or oxygen.

In order to maintain or increase the bond strength of the resultant cured polymer, one may utilize an acrylic monomer having an alcoholic or other relatively polar group substituted thereon. Examples of such polar groups in addition to the hydroxy group include, amino, amido, cyano, mercapto, and halogen polar groups. Hydroxy group containing monomers are preferred. Esters having a labile hydrogen atom or atoms are also desirable. Examples of acrylic monomers within this category include hydroxyethyl acrylate, hydroxypropyl acrylate, hydroxyethyl methacrylate, hydroxypropyl methacrylate, diacetone acrylamide, 2-cyanoethyl acrylate, 3-cyanopropyl acrylate, 2-chloroethyl acrylate, glycerol monomethacrylate, 2-hydroxy-3-chloropropyl methacrylate, etc.

Where the effect of a polar substituted monomer is desired without its actual use, in some instances a small amount (usually no more than 8%, by weight of the total composition) of an alkanol may be admixed to the composition. Such useful alkanols include, for example, methanol, ethanol, isopropanol, butanol, etc. While analogous mercapto compounds may be used in place of the alkanols with a comparable beneficial effect, their use is not favored mainly because of their unpleasant, strong odor.

The compositions of this invention cure (polymerize or set) at ambient temperatures but heat may be used to accelerate the rate of curing. Compositions containing significant amounts of hydroxy substituted acrylic monomer are further crosslinked by the application of heat resulting in increased bond strength.

The following examples will further describe and illustrate the practice of this invention but they are not intended to limit its scope. In these examples the compositions were prepared by mixing the indicated ingredients in amounts given as parts by weight (pbw) unless otherwise specified. The ingredients are identified in the following tables, I and IA.

Table I

| Designation in the Examples | Ingredient |
|---|---|
| Catalyst A | bis[4-(N,N-diethylamino)benzenediazonium] tetrachlorozincate |
| Catalyst B | bis[4-(N,N-diethylamino)-2-methoxybenzenedizonium] tetrafluoroborate |
| Catalyst C | bis[4-(N,N-dimethylamino)benzenediazonium] tetrachlorozincate |
| Catalyst D | bis[4-(N-ethyl-N-hydroxyethylamino)benzenediazonium] tetrachlorozincate |
| Catalyst E | bis(2-methyl-4-chlorobenzenediazonium) naphthalenedisulfonate |
| Catalyst F | bis(2-chlorobenzenediazonium) tetrachlorozinacate |
| Catalyst G | bis(2,5-dichlorobenzenediazonium) tetrachlorozincate |
| Catalyst H | 2-methoxy-4-(3'-methoxy-4'-diazobenzene)benzenediazonium tetrachlorozincate |
| Catalyst I | bis(3-nitro-4-chlorobenzenediazonium) tetrachlorozincate |
| Catalyst J | bis(2-methoxy-4-nitrobenzenediazonium) naphthalenedisulfonate |
| Catalyst K | bis(2-methoxy-4-nitrobenzenediazonium) tetrachlorozincate |
| Catalyst L | bis(4-nitrobenzenediazonium) tetrafluoroborate |
| Catalyst M | bis[4-(N-phenylamino)benzenediazonium] sulfate |

Table IA

| Designation in the Examples | Ingredient |
| --- | --- |
| Monomer AA | ethyleneglycol dimethacrylate |
| Monomer BB | hydroxyethyl methacrylate |
| Monomer CC | hydroxypropyl acrylate |
| Monomer DD | hydroxypropyl methacrylate |
| Monomer EE | hydroxyethyl acrylate |
| Monomer FF | pentaerythritol triacrylate |
| Monomer GG | trimethylolpropane triacrylate |
| Monomer HH | triethyleneglycol diacrylate |
| Monomer II | triethyleneglycol dimethacrylate |
| Monomer JJ | neopentylglycol diacrylate |
| Monomer KK | ethyleneglycol diacrylate |
| Monomer LL | Methyl acrylate |
| Monomer MM | ethyl methacrylate |
| Monomer NN | butyl acrylate |
| Monomer OO | octyl acrylate |
| Monomer PP | poly(butylene maleate) dimethacrylate (M.W. 2000) |
| Monomer QQ | poly(propylene glycol) dimethacrylate (M.W. 1025) |
| Monomer RR | reaction product of 2 moles hydroxyethyl acrylate and 1 mole toluene diisocyanate |
| Monomer SS | reaction product of 2 moles toluene diisocyanate, 1 mole poly(butylene adipate-phthalate) and 2 moles hydroxyethyl methacrylate |
| Monomer TT | reaction product of 2 moles toluene diisocyanate, 1 mole poly(propylene glycol) and 2 moles hydroxyethyl acrylate |
| Monomer UU | methyl methacrylate |
| Monomer VV | polypropylene glycol (M.W. 200) monomethacrylate |
| Monomer WW | polyethylene glycol (M.W. 200) monomethacrylate |
| Monomer XX | acrylamide |
| Monomer YY | isobutyl methacrylate |
| Monomer ZZ | N-(isobutoxymethyl)acrylamide |

EXAMPLES 1 – 11

These examples illustrate representative compositions of this invention prepared with a variety of diazonium salts.

| Example | Ingredients (parts by weight) Monomer | Catalyst |
| --- | --- | --- |
| 1 | 100 AA | 0.5 A |
| 2 | 100 AA | 0.5 B* |
| 3 | 100 AA | 0.5 C |
| 4 | 100 AA | 0.5 D* |
| 5 | 100 AA | 0.5 E* |
| 6 | 100 AA | 0.5 F |
| 7 | 100 AA | 0.5 G |
| 8 | 100 AA | 0.5 H* |
| 9 | 100 AA | 0.5 I |
| 10 | 100 AA | 0.5 J |
| 11 | 100 AA | 0.5 K |

*required methanol to dissolve the diazonium salt

The compositions of the above examples were each evaluated in a "finger-tight" lock test known in the art. About 2 or 3 drops of each composition were placed on the exposed threads of separate ⅜–24 iron bolts (degreased) and immediately thereafter a nut (degreased) with mating threads was run onto the bolt so that the nut was directly in the thread area of the applied composition. Measurements were made of the time-periods necessary with each composition at room temperature to achieve a finger-tight lock such that the nut could not be moved on the threads with fingers.

The results obtained with the various compositions are given in the following table.

| Example | Lock Test Time (minutes) |
| --- | --- |
| 1 | 8 |
| 2 | 13 |
| 3 | 20 |
| 4 | 10 |
| 5 | 20 |
| 6 | 7 |
| 7 | 7 |
| 8 | 35 |
| 9 | 5 |
| 10 | 5 |
| 11 | 30 |

EXAMPLES 12 – 21

These examples illustrate the use of various concentrations of catalyst in the compositions of this invention.

| Example | Ingredients (parts by weight) Monomer | Catalyst | |
| --- | --- | --- | --- |
| 12 | 100 BB | 0.125 | A |
| 13 | 100 BB | 0.25 | A |
| 14 | 100 BB | 0.50 | A |
| 15 | 100 BB | 1.00 | A |
| 16 | 100 BB | 1.50 | A |
| 17 | 100 BB | 0.125 | B |
| 18 | 100 BB | 0.25 | B |
| 19 | 100 BB | 0.50 | B |
| 20 | 100 BB | 1.00 | B |
| 21 | 100 BB | 1.50 | B |

The compositions of these examples were each evaluated in the finger-tight lock test. The bond strength of the bond between the nut and bolt formed with the composition after curing at room temperature for 2 hours was measured by means of a torque wrench. The torque required to move the nut on the threads initially, one-half turn and a full turn is noted in Table II, together with results obtained with the finger-tight lock test.

Table II

| Example | Time (minutes) | Torque (inch-pounds) Initial | ½ Turn | Full Turn |
| --- | --- | --- | --- | --- |
| 12 | 10 | 120 | 300 | 250 |
| 13 | 5 | 125 | 125 | 105 |
| 14 | 10 | 100 | 210 | 125 |
| 15 | 5 | 120 | 170 | 100 |
| 16 | 4 | 100 | 190 | 200 |
| 17 | 17 | 30 | 100 | 120 |
| 18 | 13 | 110 | 230 | 200 |
| 19 | 13 | 150 | 225 | 230 |
| 20 | 7 | 120 | 220 | 150 |
| 21 | 5 | 110 | 200 | 190 |

EXAMPLES 22 – 44

The following examples illustrate the use of various monomers in the compositions of this invention. Results obtained with the respective compositions in the finger-tight lock test are given in the last column.

| Example | Ingredients (parts by weight) Monomer | Catalyst | Lock Test Time (minutes) |
| --- | --- | --- | --- |
| 22 | 100 CC | 0.5 A | 10 |
| 23 | 100 CC | 0.5 E | 10 |
| 24 | 100 DD | 0.5 A | 7 |
| 25 | 100 DD | 0.5 E | 50 |
| 26 | 100 EE | 0.5 A | 8 |
| 27 | 100 EE | 0.5 E | 3 |
| 28 | 100 BB | 0.5 A | 15 |
| 29 | 100 BB | 0.5 E | 15 |
| 30 | 100 FF | 0.5 A | 60 |
| 31 | 100 GG | 0.5 A | 90 |
| 32 | 100 HH | 0.5 E | 3 |
| 33 | 100 II | 0.5 E | 120 |
| 34 | 100 JJ | 0.5 E | 40 |
| 35 | 100 KK | 0.5 A | 15 |
| 36 | 100 LL | 0.5 A* | overnight |
| 37 | 100 MM | 0.5 A* | overnight |
| 38 | 100 NN | 0.5 A* | overnight |
| 39 | 100 OO | 0.5 A* | overnight |
| 40 | 100 PP | 1.0 E | 60 |
| 41 | 100 QQ | 1.0 E | 30 |
| 42 | 100 RR | 1.0 E | 35 |
| 43 | 100 SS | 1.0 E | 30 |
| 44 | 100 TT | 2.0 E | 25 |

*required methanol to dissolve the diazonium salt

EXAMPLE 45 – 75

These examples illustrate compositions prepared utilizing various comonomer combinations. The compositions were evaluated in the finger-tight lock test and for bond strength after curing at room temperature for two hours by means of the torque wrench.

EXAMPLES 76 – 93

In order to vary end-use properties, the compositions may utilize plasticizers and these examples illustrate my anaerobic compositions containing various plasticizers at two levels of concentrations. The compositions were evaluated in the finger-tight lock test and for bond strength after curing at room temperature for two hours by means of the torque wrench.

| Example | Ingredients (pbw) Monomer | Catalyst | Lock Test Time (minutes) | Torque (inch-pounds) Initial | ½ turn | Full Turn |
|---|---|---|---|---|---|---|
| 45 | 90 BB 10 AA | 0.5 A | 8 | 70 | 180 | 300 |
| 46 | 70 BB 30 AA | 0.5 A | 8 | 45 | 25 | 85 |
| 47 | 90 BB 10 AA | 0.5 B | 13 | 80 | 325 | 360 |
| 48 | 70 BB 30 AA | 0.5 B | 13 | 120 | 360 | 300 |
| 49 | 90 BB 10 AA | 0.5 E | 4 | 70 | 200 | 180 |
| 50 | 70 BB 30 AA | 0.5 E | 4 | 40 | 30 | 40 |
| 51 | 90 BB 10 NN | 0.5 A | 9 | 15 | 15 | 15 |
| 52 | 80 BB 20 NN | 0.5 A | 9 | 50 | 185 | 120 |
| 53 | 90 BB 10 NN | 0.5 B | 9 | 75 | 170 | 215 |
| 54 | 80 BB 20 NN | 0.5 B | 9 | 40 | 100 | 100 |
| 55 | 90 BB 10 OO | 0.5 A | 7 | 60 | 50 | 135 |
| 56 | 80 BB 20 OO | 0.5 A | 7 | 35 | 35 | 35 |
| 57 | 90 BB 10 OO | 0.5 B | 8 | 45 | 135 | 185 |
| 58 | 80 BB 20 OO | 0.5 B | 8 | 75 | 100 | 100 |
| 59 | 90 BB 10 UU | 0.5 A | 6 | 60 | 180 | 240 |
| 60 | 80 BB 20 UU | 0.5 A | 7 | 95 | 250 | 240 |
| 61 | 90 BB 10 UU | 0.5 B | 8 | 85 | 180 | 240 |
| 62 | 80 BB 20 UU | 0.5 B | 8 | 30 | 40 | 60 |
| 63 | 80 BB 20 VV | 0.5 A | 10 | 70 | 120 | 120 |
| 64 | 80 BB 20 VV | 0.5 B | 21 | 25 | 15 | 15 |
| 65 | 80 BB 20 VV | 0.5 E | 12 | 25 | 30 | 50 |
| 66 | 80 BB 20 WW | 0.5 A | 8 | 80 | 240 | 180 |
| 67 | 80 BB 20 WW | 0.5 B | 21 | 144 | 85 | 85 |
| 68 | 80 BB 20 XX | 0.5 A | 23 | 20 | 185 | 150 |
| 69 | 80 BB 20 XX | 0.5 B | 19 | 30 | 215 | 180 |
| 70 | 80 BB 20 XX | 0.5 E | 7 | 60 | 240 | 300 |
| 71 | 80 BB 20 YY | 0.5 A | 13 | 40 | 60 | 150 |
| 72 | 80 BB 20 YY | 0.5 B | 24 | 40 | 55 | 80 |
| 73 | 80 BB 20 YY | 0.5 E | 20 | 20 | 15 | 15 |
| 74 | 80 BB 20 ZZ | 0.5 A | 11 | 40 | 100 | 240 |
| 75 | 80 BB 20 ZZ | 0.5 E | 9 | 45 | 35 | 55 |

| Example | Ingredients (pbw) Monomer and Plasticizer | Catalyst | Lock Test Time (minutes) | Torque (inch-pounds) Initial | ½ Turn | Full Turn |
|---|---|---|---|---|---|---|
| 76 | 90 BB 10 GLY* | 0.5 A | 11 | 120 | 180 | 135 |
| 77 | 70 BB 30 GLY | 0.5 A | 11 | 60 | 120 | 50 |
| 78 | 90 BB 10 GLY | 0.5 B | 29 | 60 | 180 | 180 |
| 79 | 70 BB 30 GLY | 0.5 B | 39 | 10 | 40 | 60 |
| 80 | 90 BB 10 GLY | 0.5 E | 4 | 50 | 65 | 65 |

Continued

| Example | Ingredients (pbw) Monomer and Plasticizer | Catalyst | Lock Test Time (minutes) | Torque (inch-pounds) Initial | ½ Turn | Full Turn |
| --- | --- | --- | --- | --- | --- | --- |
| 81 | 70 BB 30 GLY | 0.5 E | 4 | 10 | 40 | 60 |
| 82 | 90 BB 10 TEG* | 0.5 A | 9 | 100 | 216 | 250 |
| 83 | 70 BB 30 TEG | 0.5 A | 14 | 30 | 45 | 50 |
| 84 | 90 BB 10 TEG | 0.5 B | 23 | 130 | 240 | 240 |
| 85 | 70 BB 30 TEG | 0.5 B | 24 | 60 | 90 | 95 |
| 86 | 90 BB 10 DBP* | 0.5 A | 13 | 50 | 45 | 85 |
| 87 | 90 BB 10 DBP | 0.5 E | 8 | 55 | 40 | 40 |
| 89 | 70 BB 30 DBP | 0.5 E | 26 | 30 | 20 | 5 |
| 90 | 90 BB 10 DOP* | 0.5 A | 12 | 70 | 80 | 125 |
| 91 | 70 BB 30 DOP | 0.5 A | 25 | 35 | 20 | 15 |
| 92 | 90 BB 10 DOP | 0.5 E | 19 | 75 | 50 | 30 |
| 93 | 70 BB 30 DOP | 0.5 E | 28 | 30 | 25 | 20 |

*Legend:
GLY = glycerol
TEG = triethylene glycol
DBP = dibutyl phthalate
DOP = dioctyl phthalate

EXAMPLE 94

While my compositions are generally sufficiently stable for commercial purposes without the use of added stabilizers, it has been found that their stability (shelf life) may be significantly extended, where it is desired to do so, by the addition to the composition of small amounts of stabilizer compounds previously described, namely, Lewis acids and their salts. The instability of my compositions is exhibited and made most apparent by their delayed or partial or complete loss of cure (polymerization) under conditions that would lead to the cure of stable (unaged) compositions. Ordinarily, when stabilizer compounds ar used, the amount employed will range from about 0.001 to 1%, by weight, of the total composition.

The effect of employing various stabilizer compounds is illustrated in this example where representative compositions without and with added stabilizer are evaluated in the finger-tight lock test after undergoing accelerated aging carried out at 50°C. In this accelerated aging procedure, a polyethylene bottle about half filled with the test composition is aged in an oven having a temperature of about 50°C. The test samples are checked daily for their performance in the finger-tight locking test. As an approximate correlation between oven aging and aging at room temperature, one day of aging in the oven is about equivalent to one month of shelf life or aging at room temperature.

Thus, a composition consisting of 100 parts of hydroxyethyl methacrylate and 0.5 parts of bis[4-(N,N-diethylamino) benzenediazonium] tetrachlorozincate with no added stabilizer showed the following characteristics on aging at 50°C. as evaluated in the finger-tight lock test.

| No. of Days at 50°C. | Lock Test Time (minutes) |
| --- | --- |
| 0 | 15 |
| 3 | 14 |
| 7 | 16 |
| 9 | 31 |
| 10 | did not cure |

A number of stabilizer compounds were utilized with the described composition at several concentration levels as indicated below. Results obtained in the finger-tight lock test after aging of these compositions are also reported below.

| Stabilizer | Concentration | No. of Days at 50°C. | Lock Test Time (minutes) |
| --- | --- | --- | --- |
| p-toluenesulfonic acid | 0.05% | 0 | 19 |
| | | 50 | 18 |
| | 0.10% | 0 | 18 |
| | | 50 | 30 |
| | 0.20 | 0 | 20 |
| | | 50 | 30 |
| p-toluenesulfonic acid sodium salt | 0.05% | 0 | 23 |
| | | 50 | 30 |
| | 0.10% | 0 | 23 |
| | | 50 | 33 |
| sulfuric acid | 0.10% | 0 | 20 |
| | | 50 | 29 |
| | 0.20% | 0 | 26 |
| | | 50 | 28 |
| boron trifluoride etherate | 0.05% | 0 | 34 |
| | | 50 | 65 |
| | 0.50% | 0 | 34 |
| | | 40 | 31 |
| | | 50 | did not cure |
| zinc chloride | 0.50% | 0 | 30 |
| | | 10 | 50 |
| | | 15 | did not cure |

Comparable stabilizing effects were observed when sulfosalicylic acid, naphthalene disulfonic acid, naphthalene trisulfonic acid and disodium naphthalenedisulfonate were each employed in similar concentrations in the described composition.

In carrying out further stability evaluations, a composition consisting of 100 parts of hydroxypropyl acrylate and 0.5 parts of bis[4-(N,N-diethylamino)-2-methoxybenzenediazonium] tetrafluoroborate with no added stabilizer showed the following characteristics on aging at 50°C. as evaluated in the finger-tight lock test.

| No. of Days at 50°C. | Lock Test Time (minutes) |
| --- | --- |
| 0 | 16 |
| 3 | 35 |
| 5 | did not cure |

On the addition of p-toluenesulfonic acid to the composition at the indicated amounts and their subsequent aging at 50°C., result in the finger-tight lock test were obtained as follows.

| Stabilizer | Concentration | No. of Days at 50°C. | Lock Test Time (minutes) |
| --- | --- | --- | --- |
| P-toluenesulfonic acid | 0.05 | 0 | 16 |
|  |  | 18 | 40 |
|  | 0.20% | 0 | 28 |
|  |  | 8 | 45 |
|  |  | 18 | did not cure |

EXAMPLES 95 – 100

These examples show the utility of several compositions representative of this invention employed in connection with various metal surfaces. Each of the compositions was evaluated in the finger-tight lock test employing degreased ⅜-24 bolts and nuts of cadmium plated steel, zinc chromate plated steel, nickel plated steel, iron and copper.

| Example | Ingredients (pbw) Monomer | Catalyst | Metal | Lock Test Time (minutes) |
| --- | --- | --- | --- | --- |
| 95 | 100 BB | 0.5 E | cadmium plated steel | 30 |
| 96 | 100 EE | 0.5 C | zinc chromate plated steel | 40 |
| 97 | 100 BB | 0.5 A | nickel plated steel | 25 |
| 98 | 100 BB | 0.5 A | iron | 13 |
| 99 | 100 EE | 0.5 B | iron (heat treated) | 10 |
| 100 | 100 EE | 0.5 F | copper | 3 |

EXAMPLE 101

As already described and illustrated in the above examples, in order that my compositions polymerize or cure, the compositions require both the absence of air or oxygen and the contact of an active metal. Unexpectedly, I have found that a composition comprised of one particular acrylic monomer in combination with one particular diazonium salt, in contrast to the above-mentioned dual requisites for polymerization, merely requires the absence of air or oxygen for polymerization to take place. As can easily be recognized by a practioner in the art, this composition is an effective adhesive or sealant for materials such as glass, ceramics, rubber, etc. and its bonding properties are not limited to instances where one of the bonded substrates is a metal. This unusual composition is comprised of hydroxyethyl acrylate in combination with bis(2-methyl-4-chlorobenzenediazonium) naphthalenedisulfonate. Operable compositions can be prepared employing concentration ranges with respect to the required monomer and diazonium salt and any optional ingredients which are generally comparable to those previously given for the main compositions of this invention.

A composition was prepared by adding 0.5 parts of bis(2-methyl-4-chlorobenzenediazonium) naphthalenedisulfonate to 100 parts of hydroxyethyl acrylate with thorough mixing. About two drops of the composition was placed between the major surfaces of two glass microscope slides and the slides were arranged to be at right angles to each other to form a square overlap. The thus formed laminate was allowed to cure for twelve hours at room temperature after which period it was impossible for one slide to be moved on or removed from the other. When the slides were broken apart it was observed that the composition had fully polymerized forming a solid film. When the procedure was repeated using a composition which omitted the diazonium salt catalyst, no evidence of polymerization was observed even after 48 hours.

The stability of this composition is comparable to that achieved generally with compositions of this invention.

As will be recognized by those skilled in the art, my invention provides anaerobic curing compositions useful as adhesives and sealants which can be prepared in various formulations to provide a range of bond strength, polymerization rates, viscosities and shelf stability. Variations may be made in ingredients, proportions and procedures as long as such variations are within the scope of the following claims.

I claim:

1. An anaerobic curing composition stable when exposed to air comprising a non-aqueous mixture of a polymerizable acrylic or substituted acrylic monomer selected from the group consisting of (a) 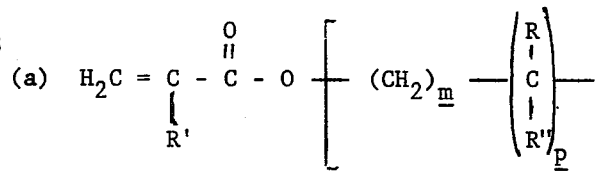

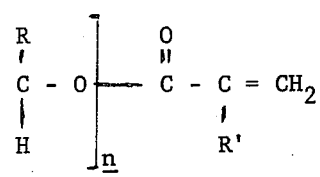

wherein

R is selected from the group consisting of hydrogen, methyl, ethyl,

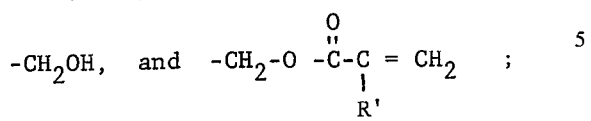

R' is selected from the group consisting of hydrogen, chlorine, methyl and ethyl;

R'' is selected from the group consisting of hydrogen, hydroxy, and

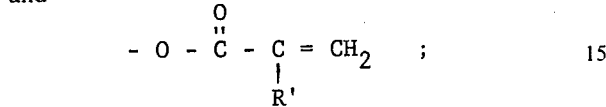

m is an integer 1 to 8; and n is an integer from 1 to 20; and p is 0 or 1;

(b)
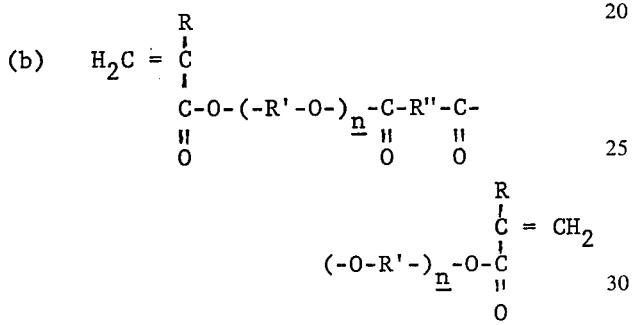

wherein

R represents hydrogen, chlorine, methyl or ethyl
R' represents alkylene with 2–6 carbon atoms,
R'' represents $(CH_2)_m$ in which m is an integer of from 0 to 8,

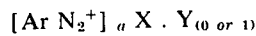

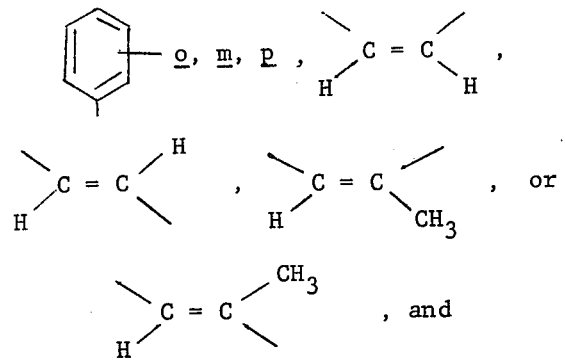

n represents an integer of from 1 to 4;

(c)
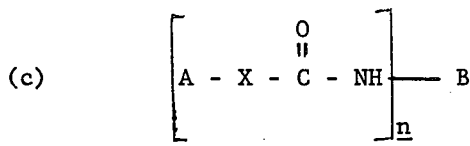

wherein X is selected from the group consisting of —O— and

and R is a member selected from the group consisting of hydrogen and lower alkyl of 1 to 7 carbon atoms,
A represents the organic residue of an active hydrogen containing acrylic ester wherein the active hydrogen has been removed, said ester being hydroxy or amino substituted on the alkyl portion thereof, and the methyl, ethyl and chlorine homologs thereof, n is an integer from 1 to 6, and B is a mono- or polyvalent organic radical selected from the group consisting of alkyl, alkylene, alkenyl, cycloalkyl, cycloalkylene, aryl, aralkyl, alkaryl, poly-(oxyalkylene), poly(carboalkoxyalkylene), and heterocyclic radicals both substituted and unsubstituted; and d. monofunctional acrylate and methacrylate esters and the hydroxy, amide, cyano, chloro, and silane substituted derivatives thereof; and from about 0.01 to 10% by weight of the monomer of diazonium salt sufficient to initiate polymerization of said acrylic monomer at room temperature in the absence of air or oxygen and on contact with an active metal surface.

2. The composition of claim 1 wherein the diazonium salt corresponds to the formula $$[Ar\ N_2^+]_a\ X\ .\ Y_{(0\ or\ 1)}$$

wherein

Ar is an aryl or substituted aryl radical,
X is an anion selected from the group consisting of $F^-$, $Cl^-$, $Br^-$, $SO_4^{--}$, $HSO_4^-$, $Ar'SO_3^-$, $Ar'(SO_3)_2^{--}$, and $Ar'(SO_3)_3^{---}$; Ar' is an aryl or substituted aryl radical;
a is integer of 1, 2 or 3 taken so as to equalize the valence charge of the diazonium salt, and Y is a stabilizing agent for the diazonium salt selected from the group consisting of $ZnCl_2$, $BF_3$, $HgCl_2$, $PtCl_2$, $PtCl_4$ and $AuCl_3$.

3. The composition of claim 2 further containing stabilizer compound selected from the group consisting of Lewis acids and salts thereof.

4. The composition of claim 1 wherein the diazonium salt is bis[4-(N,N-diethylamino)benzenediazonium] tetrachlorozincate.

5. The composition of claim 1 wherein the diazonium salt is bis[4-(N,N-diethylamino)-2-methoxybenzenediazonium] tetrafluoroborate.

6. The composition of claim 1 wherein the diazonium salt is bis[4-(N,N-dimethylamino)benzenediazonium] tetrachlorozincate.

7. The composition of claim 1 wherein the diazonium salt is bis[4(-N-ethyl-N-hydroxyethylamino)benzenediazonium] tetrachlorozincate.

8. The composition of claim 1 wherein the diazonium salt is bis(2-methyl-4-chlorobenzenediazonium)naphthalenedisulfonate.

9. The composition of claim 1 wherein the diazonium salt is bis(2-chlorobenzenediazonium) tetrachlorozincate.

10. The composition of claim 1 wherein the diazonium salt is bis(2,5-dichlorobenzenediazonium) tetrachlorozincate.

11. The composition of claim 1 wherein the diazonium salt is 2-methoxy-4-(3'-methoxy-4'-diazobenzenediazonium tetrachlorozincate.

12. The composition of claim 1 wherein the diazonium salt is bis(3-nitro-4-chlorobenzenediazonium) tetrachlorozincate.

13. The composition of claim 1 wherein the diazonium salt is bis(2-methoxy-4-nitrobenzenediazonium) naphthalenesulfonate.

14. The composition of claim 1 wherein the diazonium salt is bis(2-methoxy-4-nitrobenzenediazonium) tetrachlorozincate.

15. The composition of claim 1 wherein the diazonium salt is bis(4-nitrobenzenediazonium) tetrafluoroborate.

16. The composition of claim 1 wherein the diazonium salt is bis[4-(N-phenylamino)benzenediazonium] sulfate.

17. An anaerobic curing composition according to claim 1 comprising polymerizable hydroxyethyl acrylate monomer and from about 0.01 to 10% by weight of monomer of bis(2-methyl-4-chlorobenzenediazonium) naphthalene disulfonate sufficient to initiate polymerization of said monomer at room temperature in the absence of oxygen.

18. An anaerobic curing composition according to claim 1 comprising polymerizable hydroxyethyl methacrylate and bis[4-(N,N,-diethylamino)benzenediazonium] tetrachlorozincate.

19. An anaerobic curing composition according to claim 1 comprising polymerizable hydroxypropyl methacrylate and bis[4-(N,N-diethylamino)benzenediazonium] tetrachlorozincate.

20. An anaerobic curing composition according to claim 1 comprising polymerizable reaction product of 2 moles of toluene diisocyanate, 1 mole of poly(propylene glycol) and 2 moles of hydroxyethyl acrylate and as catalyst therefor bis[4-N,N-diethylamino)benzenediazonium] tetrachlorozincate.

21. A method of adhering closely facing surfaces, at least one being an active metal surface, which comprises interposing between said surfaces the composition of claim 1 and permitting said composition to cure in the absence of air or oxygen until said composition is set.

22. A method of adhering closely facing surfaces, at least one being an active metal surface, which comprises interposing between said surfaces the composition of claim 2 and permitting said composition to cure in the absence of air or oxygen until said composition is set.

* * * * *